(12) United States Patent
Chiu

(10) Patent No.: US 7,934,317 B2
(45) Date of Patent: May 3, 2011

(54) PIPE CUTTER

(76) Inventor: Ching-Su Chiu, Taiping (TW)

( * ) Notice: Subject to any disclaimer, the term of this patent is extended or adjusted under 35 U.S.C. 154(b) by 321 days.

(21) Appl. No.: 12/340,642

(22) Filed: Dec. 20, 2008

(65) Prior Publication Data

US 2010/0154223 A1 Jun. 24, 2010

(51) Int. Cl.
*B23D 21/08* (2006.01)
(52) U.S. Cl. .................... 30/102; 30/95; 30/101
(58) Field of Classification Search .......... 30/95, 101, 30/102, 92, 93, 94
See application file for complete search history.

(56) References Cited

U.S. PATENT DOCUMENTS 2,787,054 A * 4/1957 Franck .................. 30/102
3,022,575 A * 2/1962 Wright .................. 30/102
3,403,442 A * 10/1968 Reese et al. ............ 30/102
5,515,609 A * 5/1996 Sperti ................... 30/101

* cited by examiner

*Primary Examiner* — Stephen Choi
(74) *Attorney, Agent, or Firm* — Pai Patent & Trademark Law Firm; Chao-Chang David Pai

(57) ABSTRACT

A pipe cutter has a body, a mounting sleeve, a drive segment and an operating head. The body has multiple wheels and an extension tube. The mounting sleeve is slidably mounted in the extension tube and has two elongated holes respectively formed through two opposite sidewalls of the mounting sleeve. The drive segment is mounted in the mounting sleeve and has a blade mount, a linking shaft and a spring. The blade mount is slidably mounted in the mounting sleeve and has a mounting recess, a mounting rod, a through hole, a holding pin and a blade. The linking shaft is slidably mounted in the mounting sleeve. The spring is mounted around the mounting rod and abuts the blade mount and the linking shaft to provide a damping effect to the blade. The operating head is rotatably connected to the mounting sleeve and is connected to the drive segment.

10 Claims, 6 Drawing Sheets

PIPE CUTTER

BACKGROUND OF THE INVENTION

1. Field of the Invention

The present invention relates to a pipe cutter, and more particularly to a pipe cutter that can be operated accurately and prevents a blade of the pipe cutter from wearing down in use.

2. Description of Related Art

With reference to FIGS. 5 and 6, a conventional pipe cutter (60) is used to cut a pipe (50) and has a body (61), a mounting sleeve (62), a drive shaft (63) and an operating head (64).

The body (61) may be C-shaped and has a front end, a rear end, an internal surface, multiple wheels (611), an extension tube (612) and a position element (613). The wheels (611) are rotatably mounted in the internal surface of the body (61) near the front end. The extension tube (612) is formed on and protrudes from the rear end of the body (61) and corresponds to the wheels (611). The position element (613) is movably and radially mounted in the extension tube (612) near the rear end of the body (61).

The mounting sleeve (62) is hollow, is slidably mounted in the extension tube (612) of the body (61) and has a front end, a rear end, an inner surface, an outer surface, an inner thread (621) and multiple position grooves (622). The front end of the mounting sleeve (62) extends out of the extension tube (612) and faces to the wheels (611) of the body (61). The inner thread (621) is formed on the inner surface of the mounting sleeve (62) at the rear end. The position grooves (622) are formed on the outer surface of the mounting sleeve (62) and selectively engage the position element (613) of the body (61) to hold the mounting sleeve (62) with the body (61).

The drive shaft (63) is mounted in the mounting sleeve (62) and has a drive end, a connecting end and a blade (631). The drive end of the drive shaft (63) extends out of the front end of the mounting sleeve (62) and faces to the wheels (611) of the body (61). The blade (631) is rotatably attached to the drive end of the drive shaft (63).

The operating head (64) is rotatably engaged the inner thread (621) of the mounting sleeve (62) and is connected securely to the connecting end of the drive shaft (63) to push the blade (631) of the drive shaft (63) to move close to the wheels (611) of the body (61).

When the conventional pipe cutter (60) is used to cut a pipe (50), the pipe (50) is put transversely in the body (61) near the wheels (61) and the position element (613) is pressed relative to the body (61) to make the mounting sleeve (62) moving toward the front end of the body (61) and the blade (631) of the drive shaft (63) abutting an external surface of the pipe (50). Consequently, the pipe (50) is squeezed between the wheels (611) and the blade (631). The body (61) is rotated relative to the pipe (50) to make the blade (631) rotating with the pipe (50) to form a kerf on the external surface of the pipe (50), and the operating head (64) is simultaneously rotated relative to the mounting sleeve (62) to make the blade (631) moving toward the pipe (50) and cut the pipe (50) into two segments. Accordingly, the pipe (50) can be cut by the conventional pipe cutter (60).

However, the feeding distance of the blade (631) for cutting the pip (50) is unclear so that the operating head (64) has to be rotated continuously relative to the mounting sleeve (62) even after the pipe (50) has been cut. In addition, the drive shaft (63) has a rigid structure and may push the blade (631) overly against the external surface of the pipe (50) and this may cause the blade (631) wearing down and has to be changed with a new one.

Furthermore, when the drive shaft (63) overly presses the blade (631) against the external surface of the pipe (50), and the cross-section of the cut pipe (50) may be deformed and this will influence the fluency of the fluid flowing inside the cut segments of the pipe (50).

To overcome the shortcomings, the present invention provides a pipe cutter to mitigate or obviate the aforementioned problems.

SUMMARY OF THE INVENTION

The main objective of the present invention is to provide a pipe cutter that can be operated accurately and prevents a blade of the pipe cutter from wearing down in use.

The pipe cutter in accordance with the present invention has a body, a mounting sleeve, a drive segment and an operating head. The body has multiple wheels and an extension tube. The mounting sleeve is slidably mounted in the extension tube and has two elongated holes respectively formed through two opposite sidewalls of the mounting sleeve. The drive segment is mounted in the mounting sleeve and has a blade mount, a linking shaft and a spring. The blade mount is slidably mounted in the mounting sleeve and has a mounting recess, a mounting rod, a through hole, a holding pin and a blade. The linking shaft is slidably mounted in the mounting sleeve. The spring is mounted around the mounting rod and abuts the blade mount and the linking shaft to provide a damping effect to the blade. The operating head is rotatably connected to the mounting sleeve and is connected to the drive segment.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
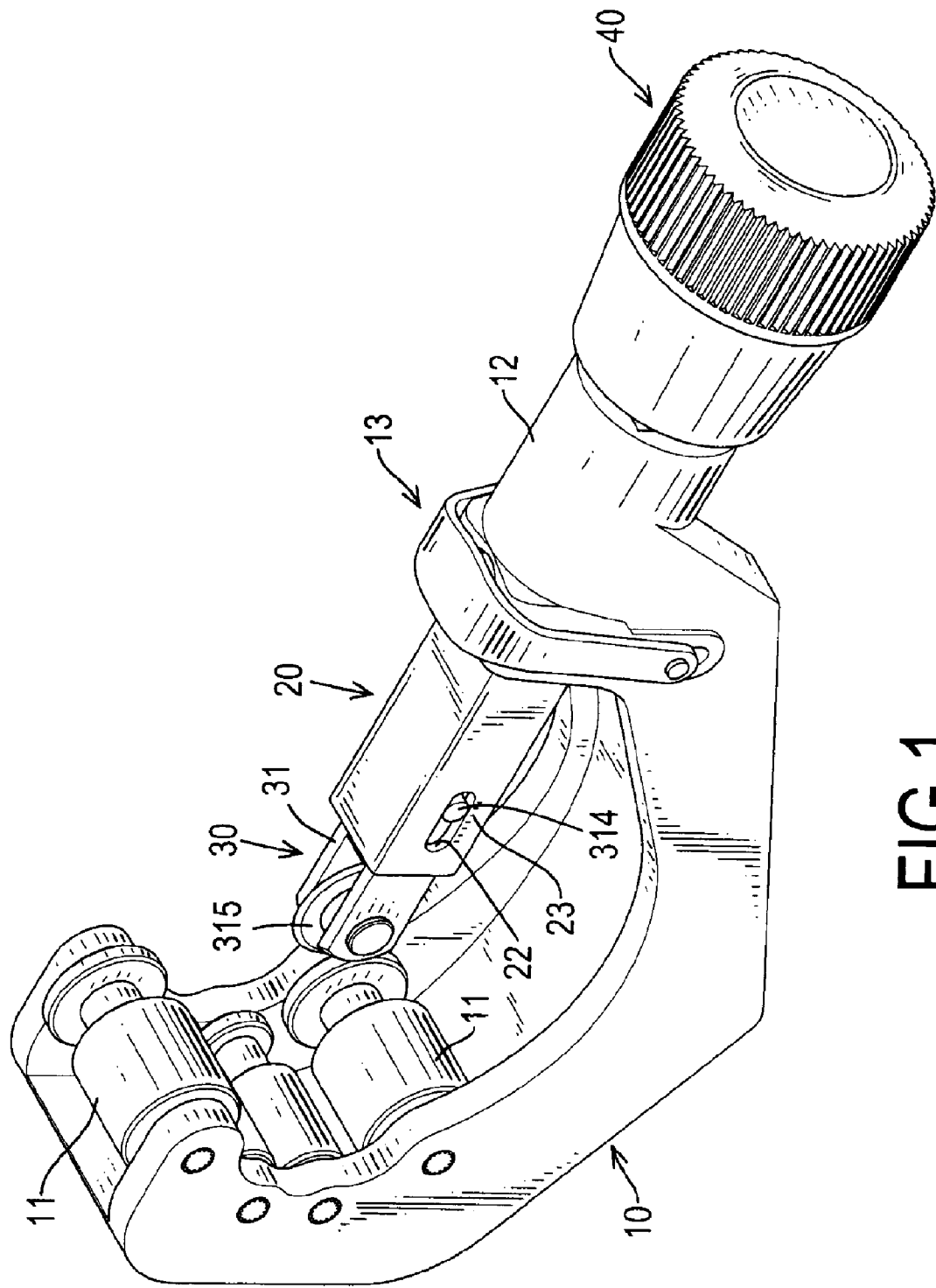
FIG. 1 is a perspective view of a pipe cutter in accordance with the present invention.
Figure 2:
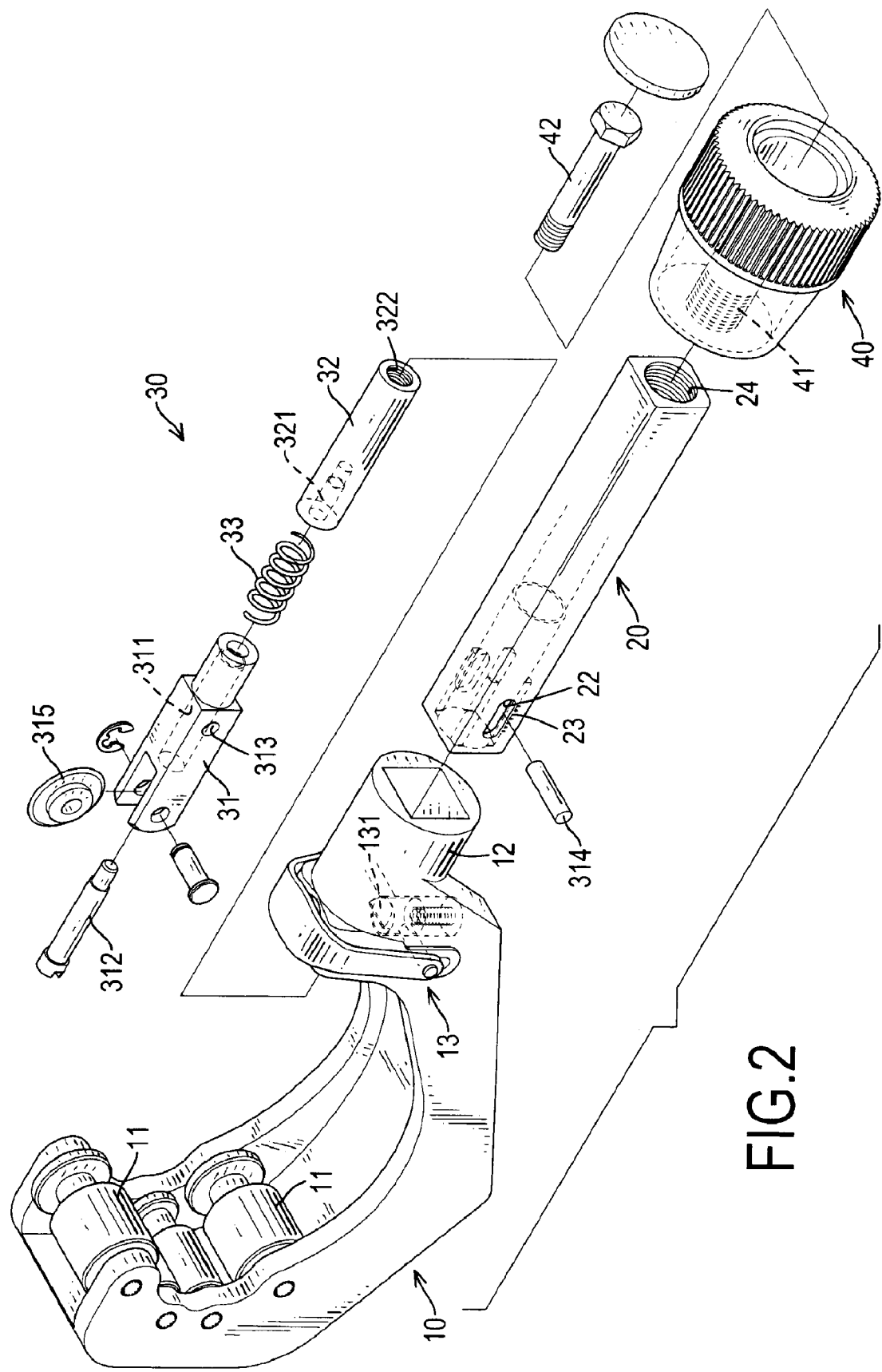
FIG. 2 is an exploded perspective view of the pipe cutter in FIG. 1.
Figure 3:
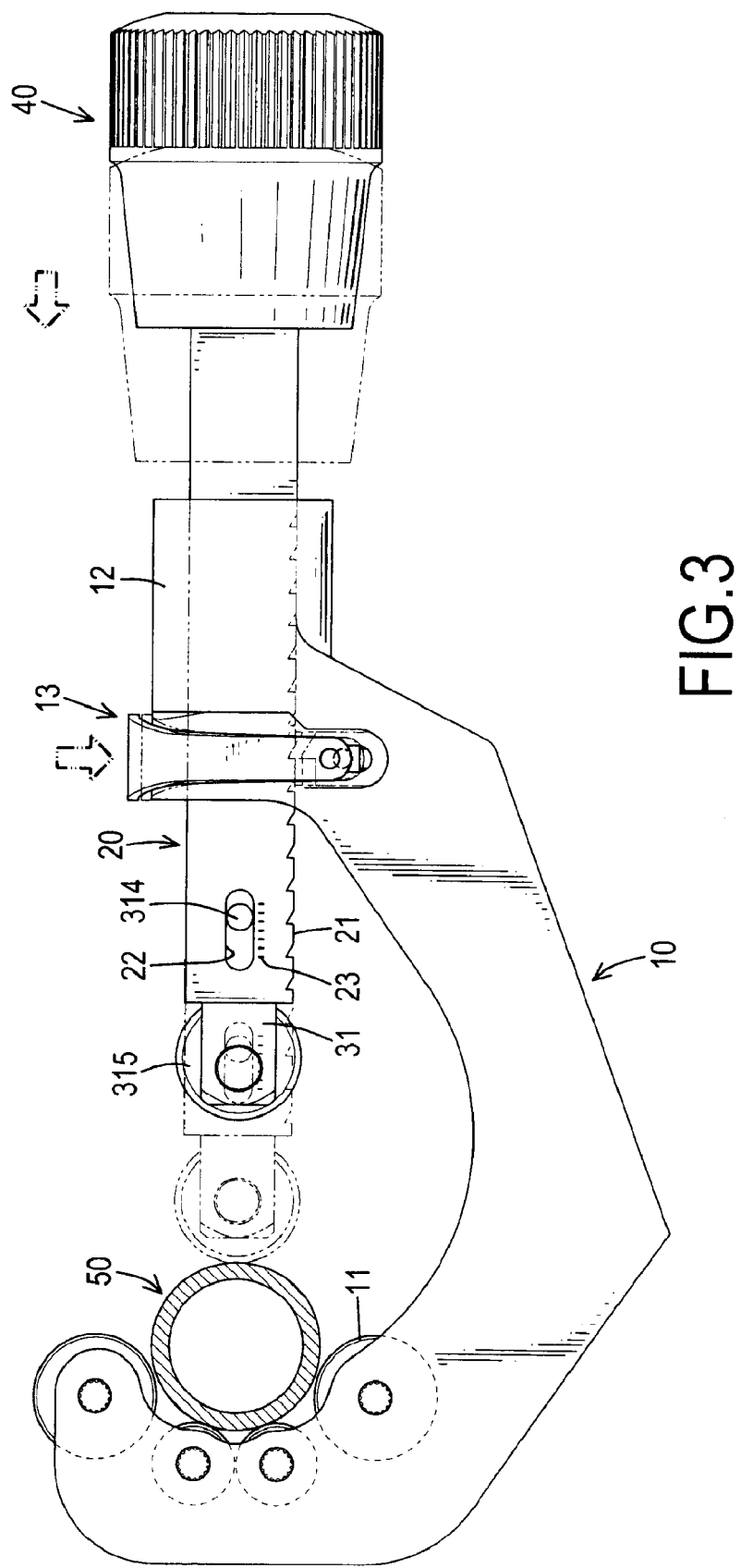
FIG. 3 is an operational side view in partial cross section of the pipe cutter in FIG. 1 showing that the pipe cutter holds a pipe in position.

With reference to FIGS. 1, 2 and 3, a pipe cutter in accordance with the present invention is used for cutting a pipe (50) and comprises a body (10), a mounting sleeve (20), a drive segment (30) and an operating head (40).

The body (10) may be C-shaped and has a front end, a rear end, an internal surface, multiple wheels (11), an extension tube (12) and a position element (13). The wheels (11) are rotatably mounted in the internal surface of the body (10) near the front end. The extension tube (12) is formed on and protrudes from the rear end of the body (10), corresponds to the wheels (11) and may have a square cross sectional mounting hole. The position element (13) is movably and radially mounted in the extension tube (12) near the rear end of the body (10) and has an engaging rod (131). The engaging rod (131) is movably mounted in the rear end of the body (10) and has a free end extended into the mounting hole of the extension tube (12).

The mounting sleeve (20) is hollow, is slidably mounted in the extension tube (12) of the body (10) and has a front end, a rear end, an inner surface, an outer surface, a bottom, two opposite sidewalls, multiple position grooves (21), two elongated holes (22), two scales (23) and an inner thread (24). The front end of the mounting sleeve (20) is mounted in and extends out of the extension tube (12) and faces to the wheels (11) of the body (10). The position grooves (21) are formed on the outer surface of the mounting sleeve (20) at the bottom and selectively engage the free end of the engaging rod (131) of the position element (13) to hold the mounting sleeve (20) with the body (10). The elongated holes (22) are respectively formed through the opposite sidewalls of the mounting sleeve (20) near the front end. The scales (23) are respectively formed on the opposite sidewalls of the mounting sleeve (20) below the elongated holes (22). The inner thread (24) is formed on the inner surface of the mounting sleeve (20) at the rear end.

The drive segment (30) is mounted in the mounting sleeve (20) and has a blade mount (31), a linking shaft (32) and a spring (33).

The blade mount (31) is slidably mounted in the mounting sleeve (20) near the elongated holes (22) and has a drive end, a middle, a connecting end, a mounting recess (311), a mounting rod (312), a through hole (313), a holding pin (314) and a blade (315). The drive end of the blade mount (31) extends out of the front end of the mounting sleeve (20) and faces to the wheels (11) of the body (10). The mounting recess (311) is axially formed in the middle of the blade mount (31) and communicates with the connecting end of the blade mount (31). The mounting rod (312) is mounted in the mounting recess (311) of the blade mount (31) and has a rear end extended out of the connecting end of the blade mount (31). The through hole (313) is transversely formed through the blade mount (31) and communicates with the mounting recess (311) and the elongated holes (22) of the mounting sleeve (20). The holding pin (314) is mounted in the through hole (313) of the blade mount (31) and has two free ends respectively mounted slidably in the elongated holes (22) of the mounting sleeve (20). The blade (315) is rotatably connected to the drive end of the blade mount (31) and faces to the wheels (11) of the body (10).

The linking shaft (32) is slidably mounted in the mounting sleeve (20) and has a front end, a rear end, an inserting chamber (321) and a threaded hole (322). The front end of the linking shaft (32) faces to the connecting end of the blade mount (31). The inserting chamber (321) is axially formed in the front end of the linking shaft (32) and is mounted around the rear end of the mounting rod (312). The threaded hole (322) is axially formed in the rear end of the linking shaft (32).

The spring (33) is mounted around the rear end of the mounting rod (312) and abuts the connecting end of the blade mount (31) and the front end of the linking shaft (32).

The operating head (40) is rotatably connected to the mounting sleeve (20), is connected to the drive segment (30) and has an inner face, a setscrew (41) and a fastener (42). The setscrew (41) is formed on and protrudes from the inner face of the operating head (40) and engages the inner thread (24) in the rear end of the mounting sleeve (20). The fastener (42) is mounted in the operating head (40) and has a front end securely mounted in the threaded hole (322) of the linking shaft (32).

In operation, with reference to FIG. 3, to cut a pipe (50) with the pipe cutter in accordance with the present invention, the pipe (50) is firstly put transversely in the body (10) near the wheels (11), and the position element (13) is pressed to make the free end of the engaging rod (131) separating from a corresponding position groove (21) on the mounting sleeve (20). Then, the mounting sleeve (20) and the drive segment (30) can be moved toward the front end of the body (10) to make the blade (315) on the front end of the blade mount (31) abutting and pressing against the external surface of the pipe (50). Consequently, the pipe (50) is held in position between the wheels (11) and the blade (315). At the same time, the location of the holding pin (314) in the elongated holes (22) is clearly shown by the scales (23) below the elongated holes (22).

Figure 4:
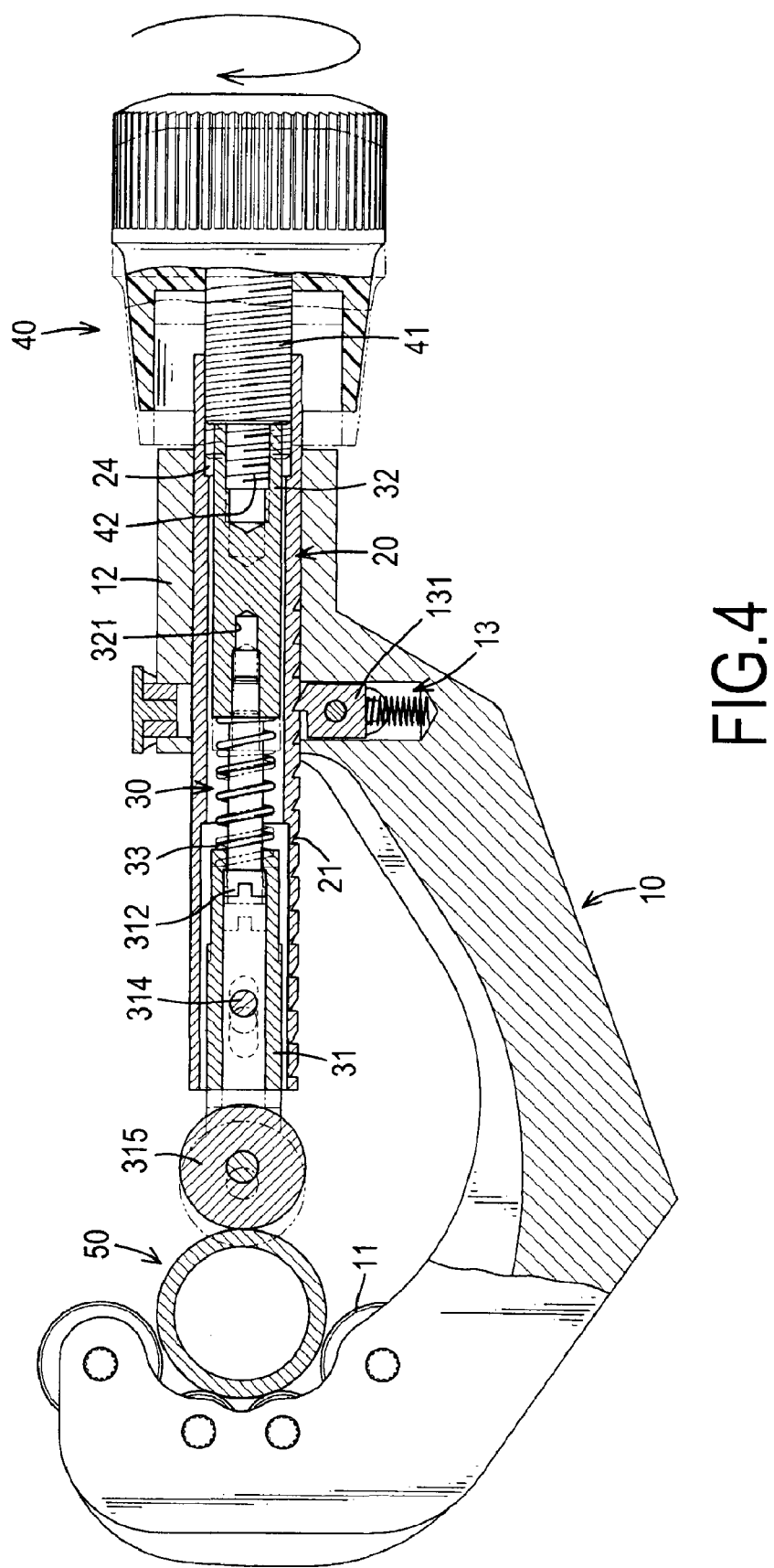
FIG. 4 is an operational side view in partial cross section of the pipe cutter in FIG. 3 showing that the pipe cutter cuts the pipe.
Figure 5:
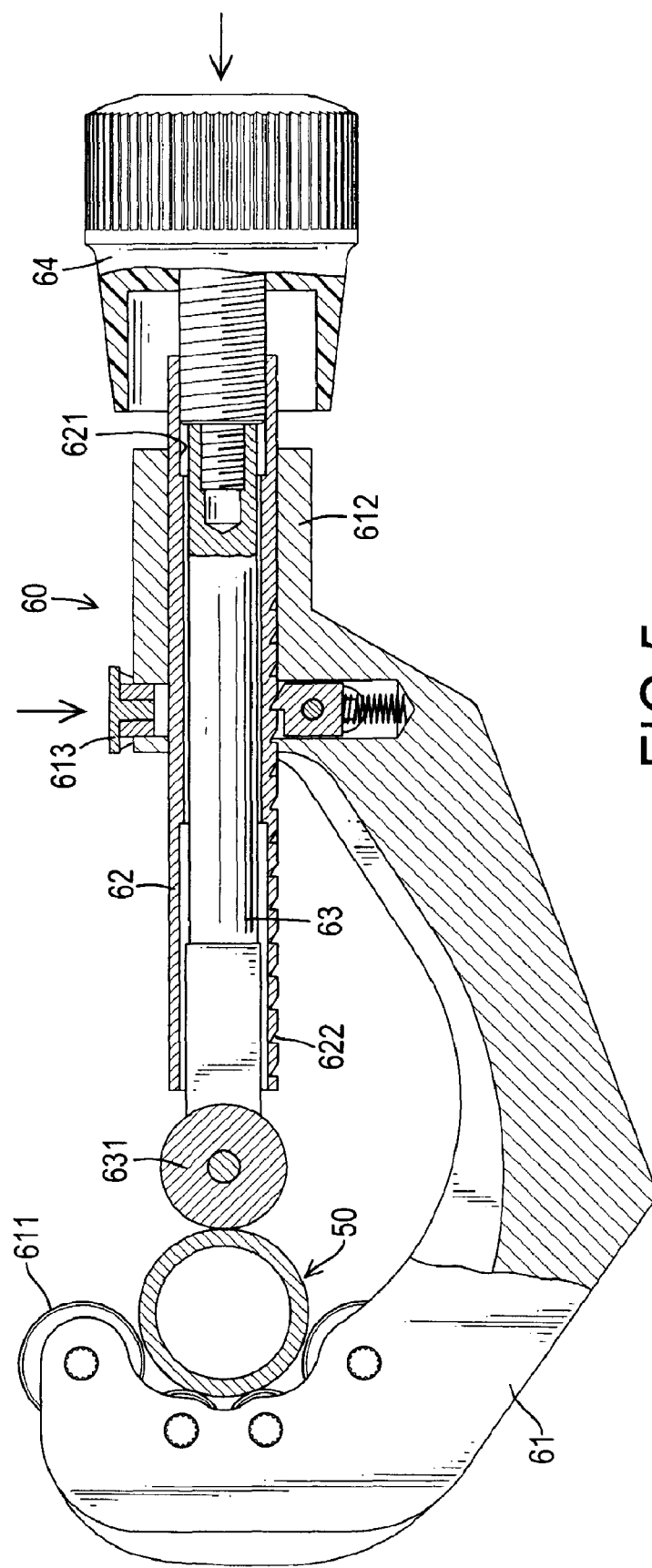
FIG. 5 is an operational side view in partial cross section of a pipe cutter in accordance with the prior art showing that the pipe cutter holds a pipe in position.
Figure 6:
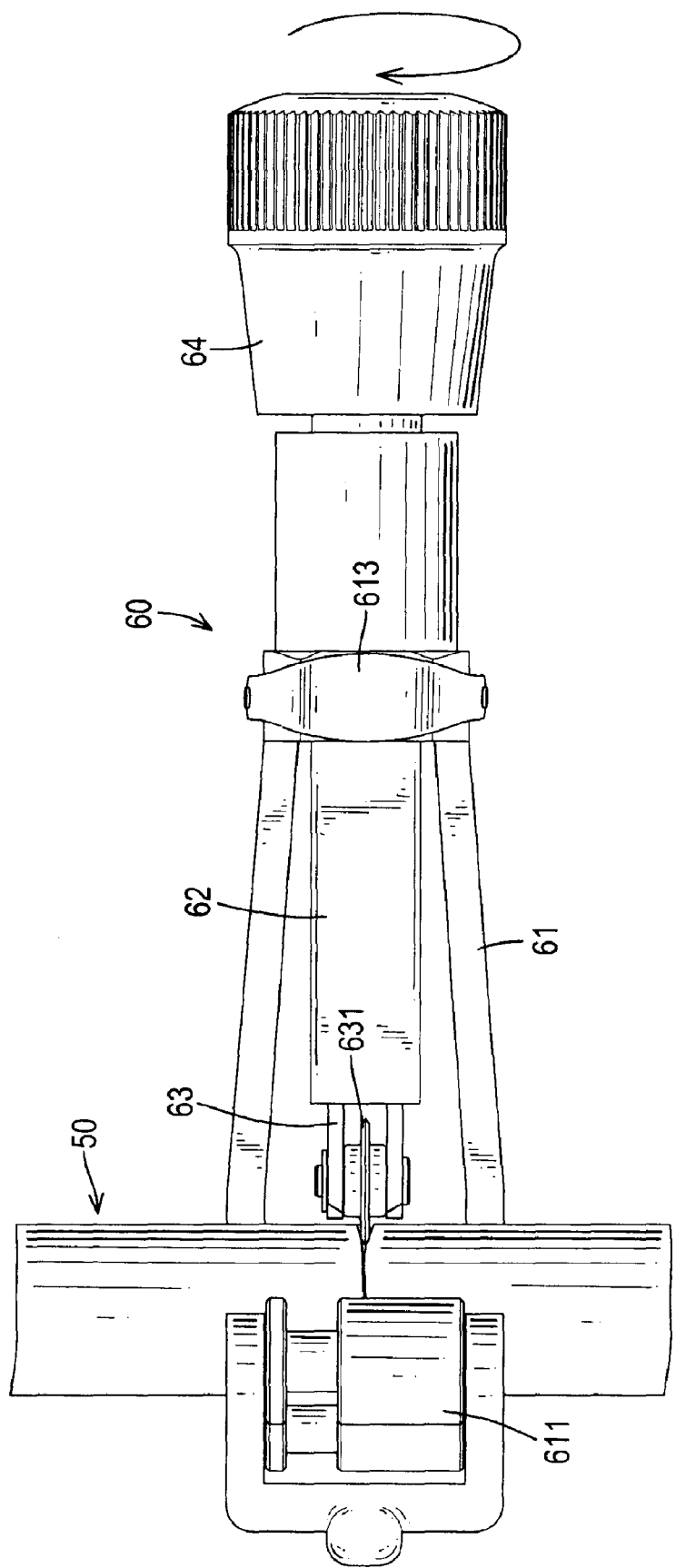
FIG. 6 is a top view of the pipe cutter in FIG. 5 showing that the pipe cutter cuts the pipe.

With further reference to FIG. 4, the body (10) is then rotated relative to the pipe (50) to make the blade (315) rotating relative to the pipe (50) to form a kerf on the external surface of the pipe (50). Consequently, the operating head (40) is rotated relative to the mounting sleeve (20) to push the linking shaft (32) moving forward. When the linking shaft (32) moves forward, the spring (33) that is mounted around the rear end of the mounting rod (312) and abuts with the linking shaft (32) pushes the blade mount (31) to move forward. Thus, the blade (315) on the front end of the blade mount (31) moves forward to cut the pipe (50) into two segments. When the holding pin (314) is moved relative to the elongated holes (22) in a distance same as a thickness of the pipe (50), the pipe (50) is cut into two segments by the pipe cutter.

When using the pipe cutter to cut the pipe (50) into two segments, a user can observe the distance of the holding pin (314) that moves relative to the elongated holes (22) by the scales (23) to determine the blade (315) has cut off the pipe (50) or not, and this can prevent continuously rotating the operating head (40) relative to the mounting sleeve (20) and overly pressing the blade (315) against the external surface of the pipe (50) to avoid the blade (315) wearing down.

In addition, the spring (33) that mounted around the rear end of the mounting rod (312) between the blade mount (31) and the linking shaft (32) not only can push the blade mount (31) moving forward with the linking shaft (32) when the operating head (40) is rotated, but also can provide a damping effect to the blade mount (31) to prevent the blade (315) wearing down from the overly pressing force that is provided by the operating head (40).

Even though numerous characteristics and advantages of the present utility model have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A pipe cutter having
  a body having
    a front end;
    a rear end;
    an internal surface;
    multiple wheels being rotatably mounted in the internal surface of the body near the front end; and an extension tube being formed on and protruding from the rear end of the body and corresponding to the wheels;
a mounting sleeve being hollow, being slidably mounted in the extension tube of the body and having
 a front end extending out of the extension tube and facing to the wheels of the body;
 a rear end;
 an inner surface;
 an outer surface;
 a bottom;
 two opposite sidewalls; and
 two elongated holes being respectively formed through the opposite sidewalls of the mounting sleeve near the front end;
a drive segment being mounted in the mounting sleeve and having
 a blade mount being slidably mounted in the mounting sleeve near the elongated holes and having
  a drive end extending out of the front end of the mounting sleeve and facing to the wheels of the body;
  a middle;
  a connecting end;
  a mounting recess being axially formed in the middle of the blade mount and communicating with the connecting end of the blade mount;
  a mounting rod being mounted in the mounting recess of the blade mount and having a rear end extending out of the connecting end of the blade mount;
  a through hole being transversely formed through the blade mount and communicating with the mounting recess and the elongated holes of the mounting sleeve;
  a holding pin being mounted in the through hole of the blade mount and having two free ends respectively mounted slidably in the elongated holes of the mounting sleeve; and
  a blade being rotatably connected to the drive end of the blade mount and facing to the wheels of the body;
 a linking shaft being slidably mounted in the mounting sleeve and having
  a front end facing to the connecting end of the blade mount;
  a rear end; and
  an inserting chamber being axially formed in the front end of the linking shaft and being mounted around the rear end of the mounting rod; and
 a spring being mounted around the rear end of the mounting rod and abutting the connecting end of the blade mount and the front end of the linking shaft to provide a damping effect to the blade; and
an operating head being rotatably connected to the rear end of the mounting sleeve and being connected to the rear end of the linking shaft of the drive segment.

2. The pipe cutter as claimed in claim 1, wherein the mounting sleeve further has two scales respectively formed on the opposite sidewalls of the mounting sleeve below the elongated holes.

3. The pipe cutter as claimed in claim 2, wherein
the mounting sleeve further has an inner thread formed on the inner surface of the mounting sleeve near the rear end;
the linking shaft further has a threaded hole axially formed in the rear end of the linking shaft; and
the operating head further has
 an inner face;
 a setscrew being formed on and protruding from the inner face of the operating head and engaging the inner thread in the rear end of the mounting sleeve; and
 a fastener being mounted in the operating head and having a front end securely mounted in the threaded hole of the linking shaft.

4. The pipe cutter as claimed in claim 3, wherein
the body further has a position element being movably and radially mounted in the extension tube near the rear end of the body and having an engaging rod movably mounted in the rear end of the body with a free end extended into the extension tube; and
the mounting sleeve further has multiple position grooves formed on the outer surface of the mounting sleeve near the bottom and selectively engaging the free end of the engaging rod of the position element to hold the mounting sleeve with the body.

5. The pipe cutter as claimed in claim 4, wherein the mounting sleeve further has a square cross sectional mounting hole.

6. The pipe cutter as claimed in claim 5, wherein the body is C-shaped.

7. The pipe cutter as claimed in claim 1, wherein
the mounting sleeve further has an inner thread formed on the inner surface of the mounting sleeve near the rear end;
the linking shaft further has a threaded hole axially formed in the rear end of the linking shaft; and
the operating head further has
 an inner face;
 a setscrew being formed on and protruding from the inner face of the operating head and engaging the inner thread in the rear end of the mounting sleeve; and
 a fastener being mounted in the operating head and having a front end securely mounted in the threaded hole of the linking shaft.

8. The pipe cutter as claimed in claim 1, wherein
the body further has a position element being movably and radially mounted in the extension tube near the rear end of the body and having an engaging rod movably mounted in the rear end of the body with a free end extended into the extension tube; and
the mounting sleeve further has multiple position grooves formed on the outer surface of the mounting sleeve near the bottom and selectively engaging the free end of the engaging rod of the position element to hold the mounting sleeve with the body.

9. The pipe cutter as claimed in claim 1, wherein the mounting sleeve further has a square cross sectional mounting hole.

10. The pipe cutter as claimed in claim 1, wherein the body is C-shaped.

* * * * *